United States Patent
Abrishami et al.

(10) Patent No.: US 6,463,135 B2
(45) Date of Patent: Oct. 8, 2002

(54) METHOD AND SYSTEM FOR OPTIMIZED FACSIMILE TRANSMISSION SPEED OVER A BANDWIDTH LIMITED NETWORK

(75) Inventors: Mehrdad Abrishami, Gaithersburg, MD (US); JianWei Bei, Rockville, MD (US); Abhinandan Dodamini, Germantown, MD (US); Richard Meyers, Montgomery Village, MD (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/779,750

(22) Filed: Feb. 9, 2001

(65) Prior Publication Data

US 2001/0033642 A1 Oct. 25, 2001

Related U.S. Application Data

(60) Provisional application No. 60/182,110, filed on Feb. 11, 2000.

(51) Int. Cl.[7] .............................................. H04M 11/00
(52) U.S. Cl. ........................ 379/100.01; 379/100.17; 379/100.09; 370/229; 370/401; 358/407
(58) Field of Search ................ 379/100.01, 100.06, 379/100.09, 100.17; 370/229, 232, 352, 353, 354, 355, 356, 401; 358/115, 403, 407, 405, 434–439, 442

(56) References Cited

U.S. PATENT DOCUMENTS 5,491,565 A * 2/1996 Naper ........................ 358/434
6,304,754 B1 * 10/2001 Schoo et al. ................ 370/352

OTHER PUBLICATIONS

Vered et al. ; A System and Method of real–time facsimile transmission ; WO 98/58492.*

* cited by examiner

Primary Examiner—Melur Ramakrishnaiah
(74) Attorney, Agent, or Firm—Trexler, Bushnell, Giangiorgi, Blackstone & Marr Ltd.

(57) ABSTRACT

A system and method for fax transmission over a fax relay network that includes at least a wideband portion and a narrowband portion, includes a first fax relay gateway communicatively connecting a sending fax machine on the wideband portion of the network to the narrowband portion of the network, the first fax relay gateway receiving image data from the sending fax machine and outputting digitized image data in accordance with a data rate of the narrowband portion of the fax relay network. A second fax relay gateway, communicatively connects a receiving fax machine to the narrowband portion of the network. At least one of the first fax relay gateway or the second fax relay gateway includes a control process that determines whether an amount of data stored in a buffer in the fax relay gateway is greater or less than a particular threshold or determines that the amount of jitter in the narrow band network exceeds a particular threshold, and if so, initiates a retrain procedure to adjust the fax data rate.

40 Claims, 5 Drawing Sheets

METHOD AND SYSTEM FOR OPTIMIZED FACSIMILE TRANSMISSION SPEED OVER A BANDWIDTH LIMITED NETWORK

CROSS-REFERENCE TO RELATED APPLICATION(S)

This application claims the benefit of priority under 35 U.S.C. §119(e) of provisional application Ser. No. 60/182,110, entitled "Fax/Data/Voice Transmission Methods and Apparatuses," filed on Feb. 11, 2000, the disclosure which is incorporated herein in its entirety.

BACKGROUND OF THE INVENTION

1. Field of the Invention

This invention relates generally to the field of facsimile data transmission. More particularly, the present invention relates to a system and method for adjusting and optimizing the transmission rate for facsimile in a FAX Relay system based on available network bandwidth. The present invention also relates to a method and apparatus for maintaining a fax transmission over a communications path that includes a narrowband network, by using a mechanism to determine the available bandwidth and dynamically adjusting facsimile flow control based on the available bandwidth. In particular, the present invention relates to a method and apparatus for maintaining a fax transmission even though a data bottleneck exists somewhere between a source and destination fax machine, which might otherwise cause the fax transmission to cease or fail due to excessive time delay caused by the bottleneck.

2. Description of the Related Art

The Telecommunication Standardization Sector(ITU-T) of the International Telecommunications Union (ITU) has defined Procedures for document facsimile transmission in the general switched telephone network in T.30 and T.4 standards. T.30 and T.4 define Group 3 facsimile service, also known as Group 3 FAX and G3 FAX. The recommendation is for "Group 3 facsimile apparatus." Group 3 facsimile apparatus includes facsimile machines, computers with fax modems and appropriate software, as well as other products. As referred to herein, the term "FAX machine" applies to any Group 3 facsimile apparatus. To facilitate understanding of the context of the present invention, the T-4 and T-30 standards are incorporated herein in their entirety.

T.30 was written for facsimile service provided over a wired telephone network, a Public Switched Telephone Network (PSTN), or a digital encoding of the analog signal such as the PCM. However, in a network in which channels are assigned low rate digital streams such as a TDMA system or a packet based system with limited bandwidth, other techniques are used to send a FAX in real-time. In order to support Group 3 FAX over such Bandwidth Limited Digital Networks (BLDNs), a FAX relay system (sending side) can be employed to demodulate the FAX analog signal and transmit digital data using the digital network and re-modulate the signal at the other relay station (receiving side) to analog signal. In such systems, in addition to demodulating and re-modulating the facsimile signal, the T.30 based relay protocol is implemented in the fax relay gateways.

When such systems can allocate bandwidth from a call to another call, It is desirable to have methods and systems to detect the network congestion information, such as, available bandwidth, network delay, and network jitter information and automatically adjust the rate of a FAX transmission in real-time to the real time changes in the corresponding network congestion information, such as, the available bandwidth, network delay, and network jitter.

FIG. 1 shows a system by which two facsimile terminals communicate with each other, whereby a digital (or other narrowband) network is utilized in the communications path between the two fax terminals. A first fax terminal (or machine) 11-1 is communicatively connected to a first private branch exchange (PBX) 13-1, whereby the PBX 13-1 is communicatively connected to a first gateway processor (or fax relay) 14-1. In other embodiments, the PBX 13-1 may alternatively be a PSTN or a plain old telephone system (POTS). The PBX 13-1 may also be connected to a data modem 12-1 and/or a telephone 10-1. The first gateway processor 14-1 provides connectivity with a narrowband network 15, which is shown, for example, as a digital network in FIG. 1. In one embodiment, the digital network may be a packet network.

Fax data is typically transmitted over conventional analog telephone lines, such as those used by a PSTN or PBX, using 64 bit-per-second pulse code modulation (PCM). The PCM-modulated fax data (analog data) needs to be converted to a different form, that is, into digital data, by the first gateway 14-1, so that the digital data can be output, for example, in packets over the digital network 15.

A second gateway (or fax relay) 14-2 provides a communicative connection to a second PBX 13-2, which provides a communicative connection to a second fax terminal (or machine) 11-2. Like the first PBX 13-1, the second PBX 13-2 may alternatively be a PSTN or a POTS. The second PBX 13-2 may also be connected to a data modem 12-2 and/or a telephone 10-2. The second gateway 14-2 receives digital data from the digital network 15, for example, in packet form, and converts the digital data into analog data having a PCM format. The PCM data is then sent over the second PBX 13-2, through which it is received by the second fax 11-2.

The digital network 15 is typically of a narrower bandwidth than the analog portions (PBX 13-1, 13-2) of the communications path between the first and second faxes 11-1, 11-2. As such, there exists a problem exists in that the digital network 15 may become a bottleneck with respect to fax data being sent between the first and second faxes 11-1, 11-2.

If the channel rate or packet throughput of the digital network 15 is equal to or greater than the native fax rate (e.g., 2400, 4800, 9600, or 14,400 bps) between the first and second faxes 11-1, 11-2, a demodulation-remodulation relay may be used. However, a problem may arise when the channel rate or packet throughput is less than the native rate of the fax machines. As discussed above, this may lead to delays in the fax transmission, which may in turn cause the fax transmission to cease due to excessive time between receipt of fax data at the fax machines since most fax protocols have built-in timing requirements that cause the fax transmission to be terminated (or retried) if the time delay exceeds certain predefined threshold values.

SUMMARY OF THE INVENTION

Therefore, it is a general object of the invention to alleviate the problems and shortcomings identified above.

In a general aspect, the present invention provides a method of fax transmission over a fax relay network that includes at least an analog portion and a digital portion of the fax relay network, the method including: receiving, at a first fax relay gateway that communicatively connects a sending fax machine to the digital portion of the fax relay network, image data from the sending fax machine; converting the image data into digital data to be sent over the digital portion of the fax relay network; storing the digitized image data in a buffer at the first fax relay gateway; outputting the digitized image data in accordance with a data rate of the digital portion of the fax relay network, the digitized image data being received by a second fax relay gateway on the digital portion of the fax relay network, the second fax relay gateway communicatively connecting a receiving fax machine to the digital portion of the fax relay network; determining an amount of data stored in a buffer at either the first fax relay gateway or the second fax relay gateway, or determining the amount of jitter in the received data packets and determining if the amount of the jitter in the reception of packets from the digital network is greater than a predefined threshold; and monitoring the reception of a message confirmation (MCF) message from the receiving fax machine after the reception of a page; wherein if the determination made of the amount of data stored in the buffer at either the first fax relay gateway or the second fax relay gateway, is that the amount of data stored in the buffer is greater or less than a particular threshold, or that the determination is that the amount of jitter in the reception of packets from the digital network is greater than the predefined threshold, forcing the sending fax machine to initiate a procedure to adjust the transmission data.

In another aspect, the present invention provides forcing the sending fax machine to initiate a procedure do adjust the transmission data rate by replacing the MCF from the receiving fax machine with an RTP (retrain positive) message prior to transmission of a next fax page.

In another aspect, the present invention provides that the sending fax machine is communicatively connected to a first public switched telephone network, the first public switched telephone network communicatively connecting the sending fax machine with the first fax relay gateway.

In a further aspect of the present invention, the receiving fax machine is communicatively connected to a second public switched telephone network, the second public switched telephone network communicatively connecting the receiving fax machine with the second fax relay gateway.

In one aspect of the present invention, the image data received by the first fax relay gateway is converted from pulse-code-modulated format to digital format, by the first fax relay gateway, and the digital data received by the second fax relay gateway is converted from digital format to pulse-code-modulated format, by the second fax relay gateway.

In another general aspect, the present invention provides a method of fax transmission over a fax relay network that includes at least a wideband portion and a narrowband portion, the method includes: receiving, at a first fax relay gateway that communicatively connects a sending fax machine to the narrowband portion of the fax relay network, image data from the sending fax machine; storing the image data in a buffer at the first fax relay gateway; outputting the digitized image data in accordance with a data rate of the narrowband portion of the fax relay network, the digitized image data being received by a second fax relay gateway on the digital portion of the fax relay network, the second fax relay gateway communicatively connecting a receiving fax machine to the digital portion of the fax relay network; determining an amount of data stored in the buffer at the first fax relay gateway, or determining the amount of jitter in the received data packets and determining if the amount of the jitter in the reception of packets from the narrowband network is greater than a predefined threshold; and monitoring the reception of a message confirmation (MCF) message from the receiving fax machine after the reception of a page; wherein if the determination made of the amount of data stored in the buffer at the first fax relay gateway or in a buffer at the second fax relay gateway, is that the amount of data stored in one of the two buffers is greater or less than a particular threshold, or that the determination is made that the amount of jitter in the reception of packets from the narrowband network is greater than a predefined threshold, replacing the MCF from the receiving fax machine with an RTP (retrain positive) message to force the sending fax machine to initiate a retrain procedure prior to the transmission of the next fax page.

In one aspect of the present invention, the narrowband portion is a digital network while the wideband portion is an analog network.

In another aspect of the present invention, the fax relay gateway is a multi-channel system with a single processor handles voice/fax/data calls wherein a collocated process determines the available bandwidth and notifies a channel processor.

In a further aspect of the present invention, the detection of a fax signal in voice by the channel processor is used to determine the need to request for bandwidth adjustment from the collocated process, wherein the detection of the FAX in a voice channel may include decoding of the ITU-T specified V.8 CM and JM sequence, In one aspect, the present invention provides that a local process at the gateway determines the available bandwidth and notifies a channel processor.

In another aspect, the present invention provides that a probing mechanism determines network delay, bandwidth and packet jitter on a call-by-call basis at the start of a facsimile call, wherein the probing mechanism may include transmission of data from the first relay gateway to the second relay gateway or transmission of data from the second relay gateway to the first relay gateway.

In one aspect of the present invention, the probing mechanism probes network delay, bandwidth and packet jitter prior to the pre-message procedure defined in the International Telecommunications Union Telecommunications Standardization Section (ITU-T) Recommendation T.30.

In a further aspect of the present invention, the amount of network delay, bandwidth, or jitter in the reception of probing signals from the digital packet network is used to manipulate the Digital Identification Signal (DIS) signal from the receiving fax machine to the sending fax machine, wherein the DIS signal is manipulated by choosing a lower fax transmission rate.

In another aspect of the present invention, the amount of network delay, bandwidth or jitter in the reception of probing signals from the digital packet network is used to manipulate a Training Check Function (TCF) signal at one of the fax relay gateways.

In a further aspect of the present invention, the TCF training sequence following a pre-message handshake is corrupted by either the first fax relay gateway or the second fax relay gateway to force the end-to-end fax transmission rate to accommodate the digital network bandwidth, delay and jitter characteristic.

In another aspect of the present invention, if a first corruption of the TCF training sequence does not reduce the fax transmission rate to a pre-determined rate, a subsequent TCF sequence is corrupted by either the first or the second fax relay gateway.

In one aspect of the present invention, a real-time monitoring of the network throughput, delay and packet jitter during the transmission of a page by the first or second fax gateway is used to force a rate renegotiation for subsequent fax transmission pages by replacing the MCF with an Retrain Positive (RTP) message.

In another important aspect, the present invention provides a system for fax transmission over a fax relay network that includes at least a wideband portion and a narrowband portion, the system including :a first fax relay gateway communicatively connecting a sending fax machine on the wideband portion of the network to the narrowband portion of the network, the first fax relay gateway receiving image data from the sending fax machine and outputting digitized image data in accordance with a data rate of the narrowband portion of the fax relay network; and a second fax relay gateway, communicatively connecting a receiving fax machine to the narrowband portion of the network, wherein at least one of the first fax relay gateway or the second fax relay gateway includes a control process that determines whether an amount of data stored in a buffer in the fax relay gateway is greater or less than a particular threshold or determines that the amount of jitter in the narrow band network exceeds a particular threshold, and if so, initiates a retrain procedure to adjust the fax data rate.

In one aspect of the present invention, one of the first fax relay gateway or the second fax relay gateway includes a single Digital DSP running the control process and at least one channel processor.

In another aspect of the present invention the channel processor includes a voice/fax/data detector that detects a fax signal in a voice channel and the detection of the fax signal is used by the control process to determine bandwidth to be allocated to that channel processor.

In a further aspect of the present invention, the channel processor comprises a fax modem and a T-30 based fax relay protocol processor to control fax transmissions from the channel processor, wherein the channel processor further comprises a bandwidth adapter that adjusts the fax transmission rate from the channel processor.

In another aspect of the present invention, the control process runs on a processor separate from a Digital Signal Processor (DSP) that runs a channel processor.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DESCRIPTION OF THE PREFERRED EMBODIMENT(S)

In a general aspect, the present invention provides a system supporting facsimile relay within a single or multi-channel DSP where the available bandwidth per channel is variable from call to call. In a preferred embodiment, the system supporting facsimile relay includes modulator/demodulators as well as protocols to implement the T.30 protocol and its various phases. One aspect of the invention seeks to achieve the highest rate of facsimile transmission in a BLDN where the bandwidth is variable from call to call or during a facsimile transmission (i.e., within a call). Another aspect of the invention is to ensure that the fax transmission is successful even in the presence of high network delay and network jitter.

At a high level, the present invention includes two steps: (I) A method of determining the available bandwidth in real-time during the transmission of a fax as well as on call-by-call basis. (II) A method of adjusting the rate of the facsimile transmission to match the available bandwidth. Each of these two high-level steps are discussed in greater detail further herein.

In accordance with the first high level step, the available bandwidth can be determined by using one or more of the following seven techniques that are discussed next.

(1) A FAX Relay gateway processor (FIG. 1, 14-1 or 14-2) monitors its transmission queues (a buffer) toward the BLDN at the start of the FAX call. When the outstanding transmit data within the buffer exceeds a certain threshold, the FAX relay gateway software is notified to take appropriate actions to reduce the fax transmission rate to better match the available bandwidth. Of course, in an alternate embodiment, such as when a fax transmission is transmitted over a satellite link, the buffer can also be monitored to determine if the stored data in the buffer falls below a certain threshold, so that the fax transmission rate can be adjusted upward to make optimal use of the available bandwidth.

Figure 2:
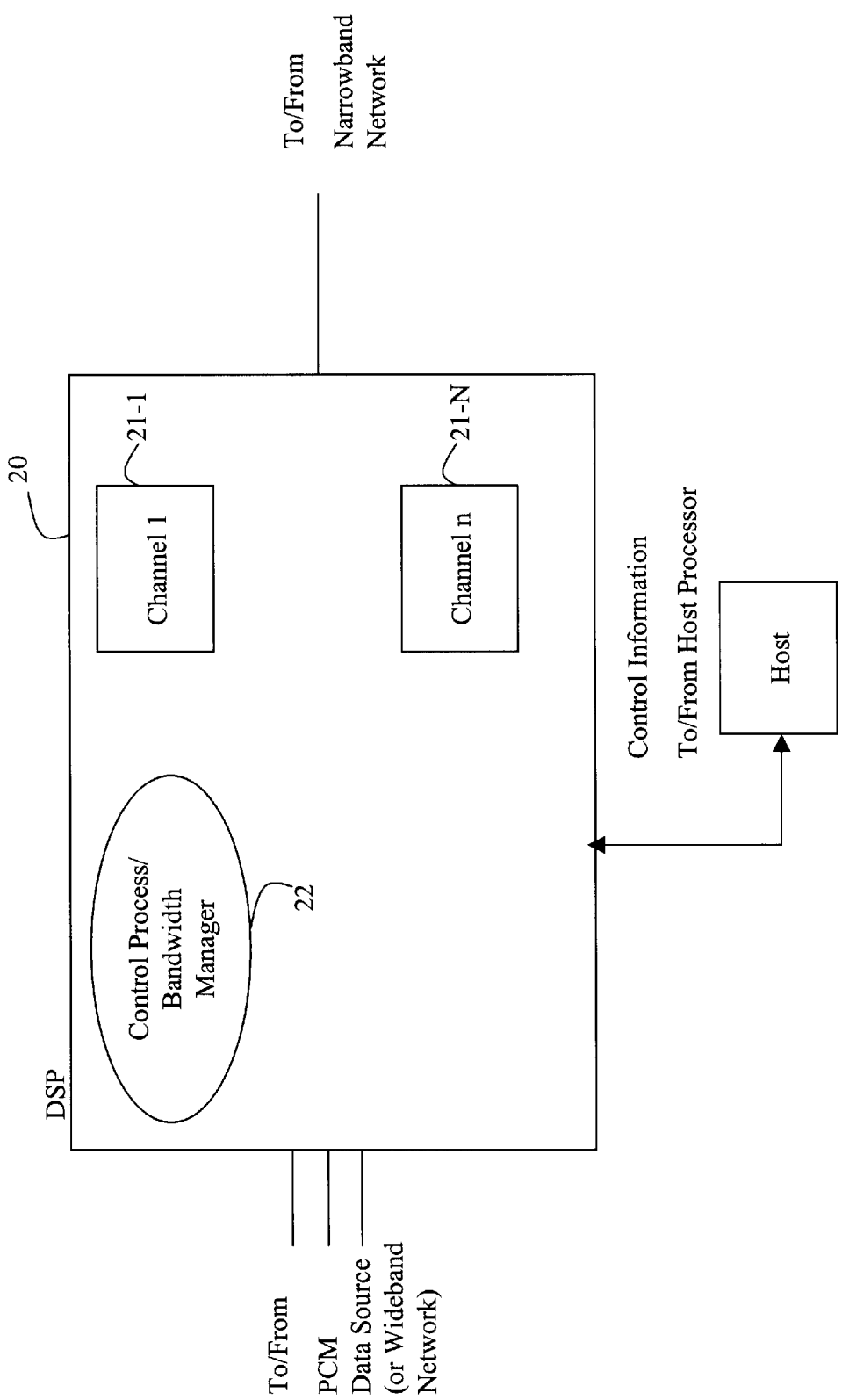
FIG. 2 is a block diagram of a Digital Signal Processor (DSP) implementation of a fax relay gateway processor supporting multiple virtual channel of voice/fax and voiceband data relay over a low speed digital or packet network.

(2) In a multi-channel system shown in FIG. 2, where a single processor 20 handles multiple voice/fax/data calls via multiple (21-1 to 21-N) channel processes, a collocated process 22 (or bandwidth manager) determines the available bandwidth for each channel and notifies the respective channel processors.

(3) In a voice/fax/data fax relay gateway supporting multiple channels of communications (14-1 in FIG. 1), available bandwidth may be determined by a local process (or bandwidth monitor 22A in FIG. 4) at the gateway, located separate from the channel processor(s), that performs similar functions as the collocated process 22 located within a single processor 20. The available bandwidth information is then notified to a channel processor.

Figure 3:
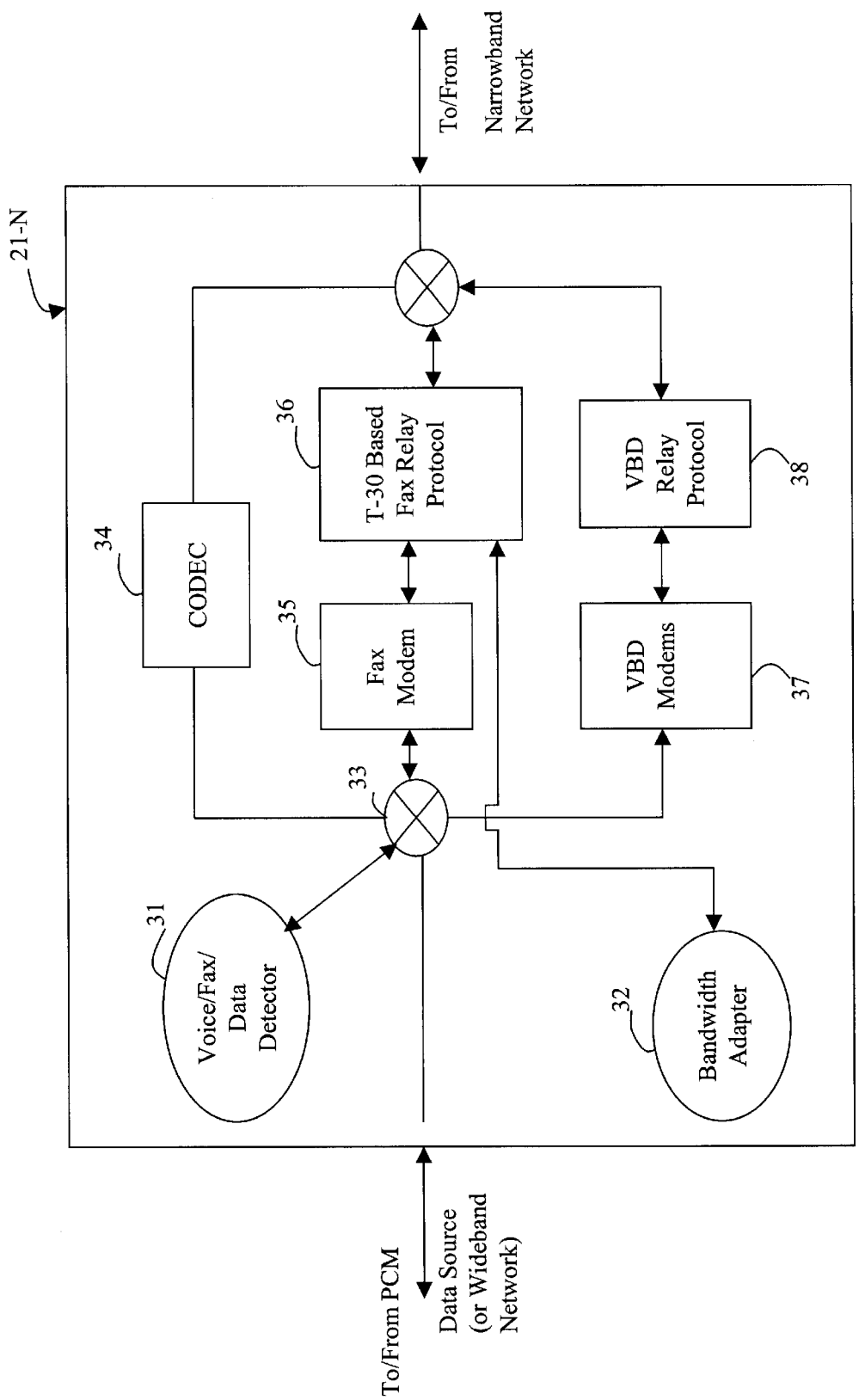
FIG. 3 is a block diagram of a voice/fax/voice-band data relay virtual channel processor including a bandwidth adapter.

(4) FIG. 3 shows a voice/fax/data detector 31, resident with a "bandwidth adapter" 32 within a DSP. 20. The voice/fax/data detector 31 controls the switch 33. Upon the detection of fax, the voice CODEC 24 and the voice band data (VBD) modem 37 and the VBD relay protocol processor 38 are logically removed and replaced with the Fax modem 35 and T.30 based fax relay protocol processor 36. The detection of FAX in a voice channel is then used to request for the adjustment of the available bandwidth from a bandwidth manager based on assumptions of different bandwidth usage by a fax transmission when compared to a voice channel or a voice band data transmission.

(5) The detection of the FAX in a voice channel by the decoding of the ITU-T specified V.8 CM and JM sequence, can be used to request for adjustment of the available bandwidth from a bandwidth manager.

(6) A probing mechanism is used to determine the network delay, bandwidth and packet jitter on a call-by-call basis at the start of a facsimile call. This information is then used to adjust fax transmission rate to the available bandwidth (if needed). The probing mechanism, operating under the control of the control process 22 or the bandwidth monitor 22A, may include, for example, transmission of data from the receiving gateway to the transmitting gateway as well as the transmission of data from the transmitting gateway to the receiving gateway prior to the pre-message procedure of the ITU-T Recommendation T.30. The ITU-T Recommendation T.30 defines the pre-message procedure to include the identification of capabilities and the commanding of the chosen conditions as well as the confirmation of acceptable conditions.

(7) Real-time monitoring of the network throughput, delay, and packet jitter during the transmission of a page by the receiving and/or the transmitting fax relay gateway is used to force a rate renegotiation for the subsequent fax transmission pages by, for example, sending a Retrain Positive (RTN) signal to the sending machine even though the receiving fax machine has sent an message confirmation (MCF) signal to the transmitting fax gateway. MCF is Message Confirmation signal defined in ITU-T T-30 Recommendation as a message that indicates that a complete message has been satisfactorily received and that additional messages may follow. This is a positive response to MPS, EOM, EOP, RR and PPS messages (also defined in the T-30 standard). Replacement of the MCF with a RTP will initiate a retrain sequence between the end-to-end sending and receiving fax machines. Manipulation of the retrain signal, for example, by corruption of the training sequence by the gateways 14-1 or 14-2 (FIG. 1), or a regeneration of Training Check Function (TCF) training pattern with corrupted data, can be used to ensure that subsequent fax page transmission is slowed down to match the network throughput.

The adjustment of the bandwidth on-demand may be used to either increase or decrease the rate of transmission of the FAX. For example, in a second embodiment of the present invention, for fax relay over a satellite communications link, the two satellite modems on either end of the FAX gateways may switch and acquire over a pre-selected, reserved, incrementing or decrementing data rate. This process may be initiated when a fax modem is detected over the line.

The techniques to adjust the rate of the facsimile transmission (the second high level step of the present invention) to match the available bandwidth is described herein in the following paragraphs.

Upon the reception of the available bandwidth information (for example, using one of the seven techniques discussed earlier herein), and if the bandwidth information indicates that the rate of the fax transmission should be lowered, the fax relay protocol processor 36 (FIG. 3) will adjust the capabilities information as well as automatically corrupt the TCF signal, which is a training sequence meant to probe the terrestrial line quality at the start of a call. The TCF corruption can occur at either sending fax relay gateway (closer to the transmitting FAX machine) or the receiving fax relay gateway (closer to the receiving FAX machine) or at both gateways. The TCF data corruption results in the step wise lowering of the rate of page transmission. That is, following a TCF corruption, the transmission rate is further lowered to the next lower rate. Successive TCF corruptions will further bring down the page transmission rate. That is, the reception of corrupted TCF data results in stepwise lowering of the fax transmission rates until TCF data that is transmitted in not corrupted. This provides an effective way to control the FAX transmission rate to better match available (or allocated) network bandwidth.

During the transmission of the first page and every subsequent page, the transmitting gateway monitors the effective network throughput. In addition, the network delay and network jitter may also be monitored in real-time. This monitored information can be used to determine if the transmission rate for the subsequent page should be adjusted to ensure that the next page is transmitted properly. One method is to modify the Message Confirmation (MCF) message that is defined in T-30 to indicate that a complete message has been satisfactorily received and that additional messages may follow. That is, MCF is a positive response to MPS, EOM, EOP, RR and PPS. The MCF can be modified into a Retrain Positive (RTP) message that is defined in T-30 to indicate that a complete message has been received and that additional messages may follow after retransmission of training and the receipt of Confirmation to Receive (CFR) handshake message also defined in the T-30 standard.

The RTP may be sent from the transmitting gateway toward the receiving gateway. Subsequently, this message is transmitted from the receiving gateway to the sending fax machine. The sending fax machine then initiates the transmission of the training sequence between pages. Although the receiving fax machine did not request a retrain (it actually sent a MCF message), the receiving fax machine is a slave to the sending fax machine and follows its commands. Thereafter, the training data of the TCF may be corrupted by the receiving fax gateway, sending fax gateway or both. This corruption of the TCF sequence continues until the transmission rate between the two fax machine is within a predetermined threshold that better matches an available bandwidth for the fax transmission. Using this method the next page can be transmitted from the sending fax machine to receiving fax machine in the presence of low bandwidth availability or high packet jitter in the network without a timeout preventing the fax transmission from being completed.

Some of the preferred embodiments of the invention, will now be discussed further herein.

Figure 1:
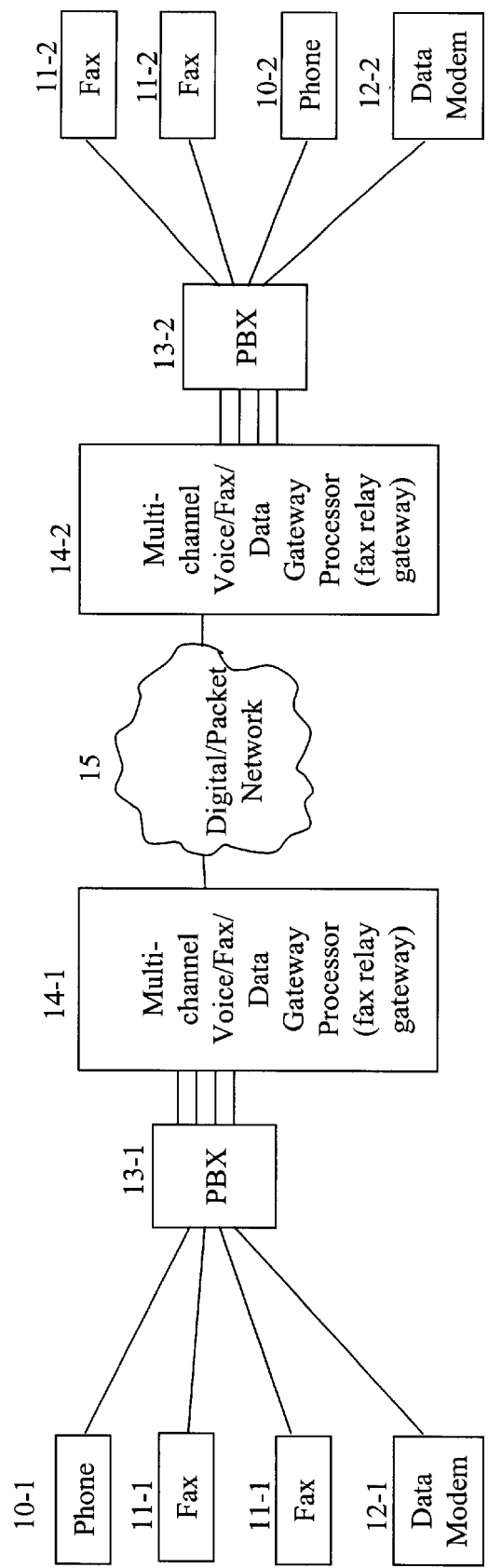
FIG. 1 is a block diagram of a facsimile network wherein the transmission path includes a narrowband network.

As discussed earlier, a basic facsimile transmission includes several steps. FIG. 1 illustrates a network to relay facsimile transmission over a digital or a packet network ("narrowband network") using FAX relay gateways. The first step is call setup, during which a calling FAX machine dials the telephone number of a called FAX machine. The called FAX machine answers the ring signal initiated by the calling FAX machine by going off-hook. In such networks, all calls initiate as voice and transition to processing the call as a facsimile transmission based on a call discrimination logic. Once the PSTN calls are established on both ends, the two Group 3 terminals are virtually linked. All standard T.30 session establishment and capabilities negotiation is carried out between the terminals via demodulation and re-modulation of analog signals. In the preferred embodiment, the FAX relay gateway in a digital packet network is based on a DSP supporting multiple virtual voice/FAX and voice band data connections. In one scenario, as illustrated in FIG. 2, a collocated process 22 monitors the activity and service types associated with each of the channel process (21-1 to 21-N). This control process monitors the bandwidth requirement of each channel and also maintains the overall link budget corresponding to the multi-channel DSP.

FIG. 3 depicts the components of an individual virtual channel process (for example, any one of the channel processes 21-1 to 21-N). When a "voice/FAX/Data" detector 31 discriminates the call between the voice and a facsimile, it notifies the control process 22 (FIG. 2) and requests for the available bandwidth that can be allocated to that call. The control process 22, also referred here as the "bandwidth manager", maintains the bandwidths allocated to the other virtual channels and assigns the maximum (or optimal) bandwidth without effecting the operation of the other virtual channels. In this scenario the bandwidth required for each virtual channel is varied based on the service type.

The adjustment of the bandwidth on-demand may be used to either increase or decrease the rate of transmission of the FAX. For example, in a second embodiment of the present invention, for fax relay over a satellite communications link, the two satellite modems on either end of the FAX gateways, switch and acquire over a pre-selected, reserved, incrementing or decrementing data rate. This may be initiated when a fax modem is detected over the line.

Figure 4:
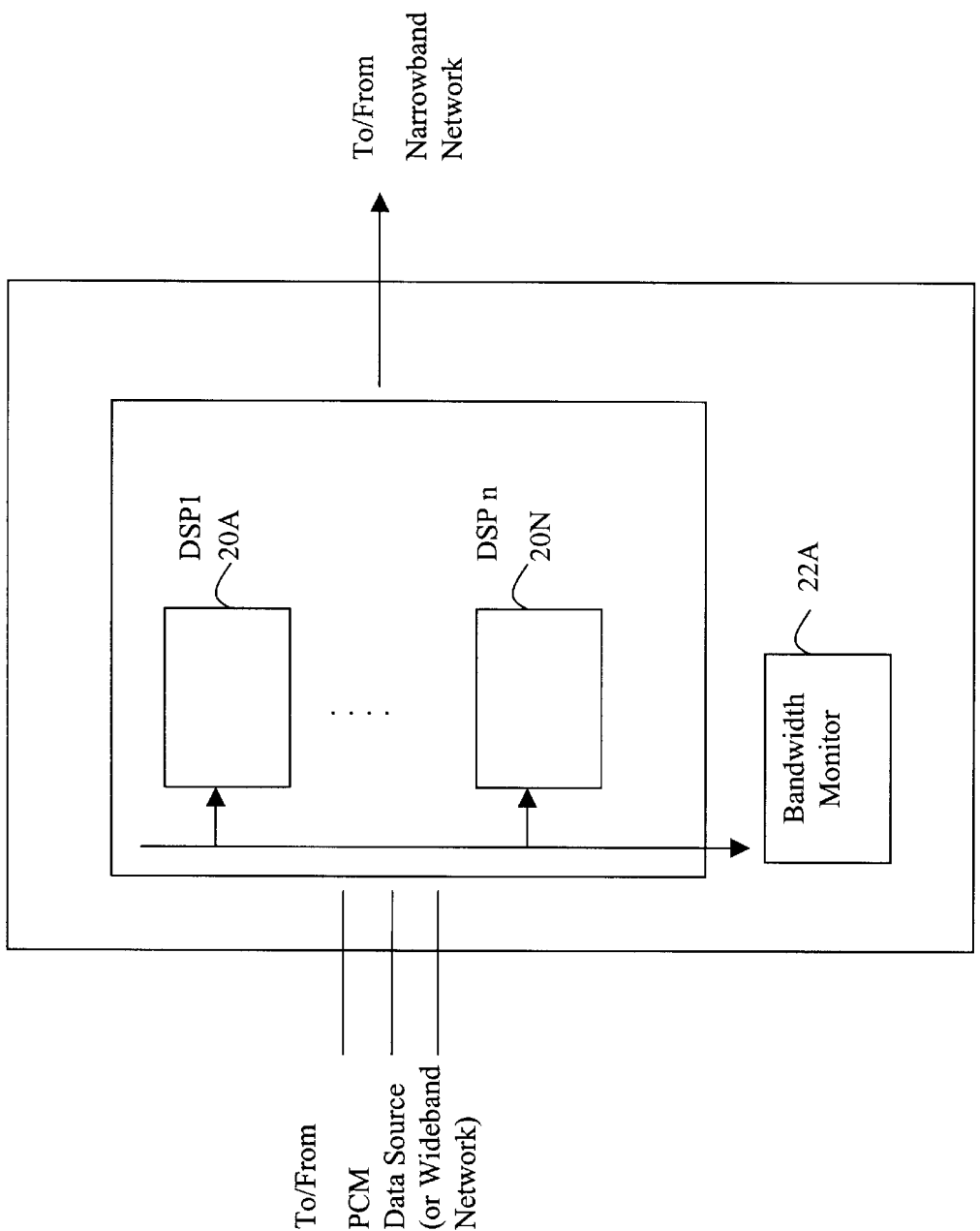
FIG. 4 is a block diagram of a fax relay gateway processor supporting multiple virtual channels with an external bandwidth monitor.

In one embodiment, as illustrated in FIG. 4, the control process 22A that determines the available bandwidth for a facsimile call may reside outside of the multi-channel processor 20A. In that case the "bandwidth Manager" 22A maintains the link budget for all virtual channels associated with the entire module (including the multiple DSPs 20A to 20N) and assigns the appropriate bandwidth based on the detection of a FAX call for each channel of a DSP.

In the preferred embodiment of the retraining procedure, the TCF is either generated locally or it is transferred between the terminals, depending on the mode of operation, to synchronize modulation rates between the gateways and Group 3 FAX terminal equipments.

Figure 5:
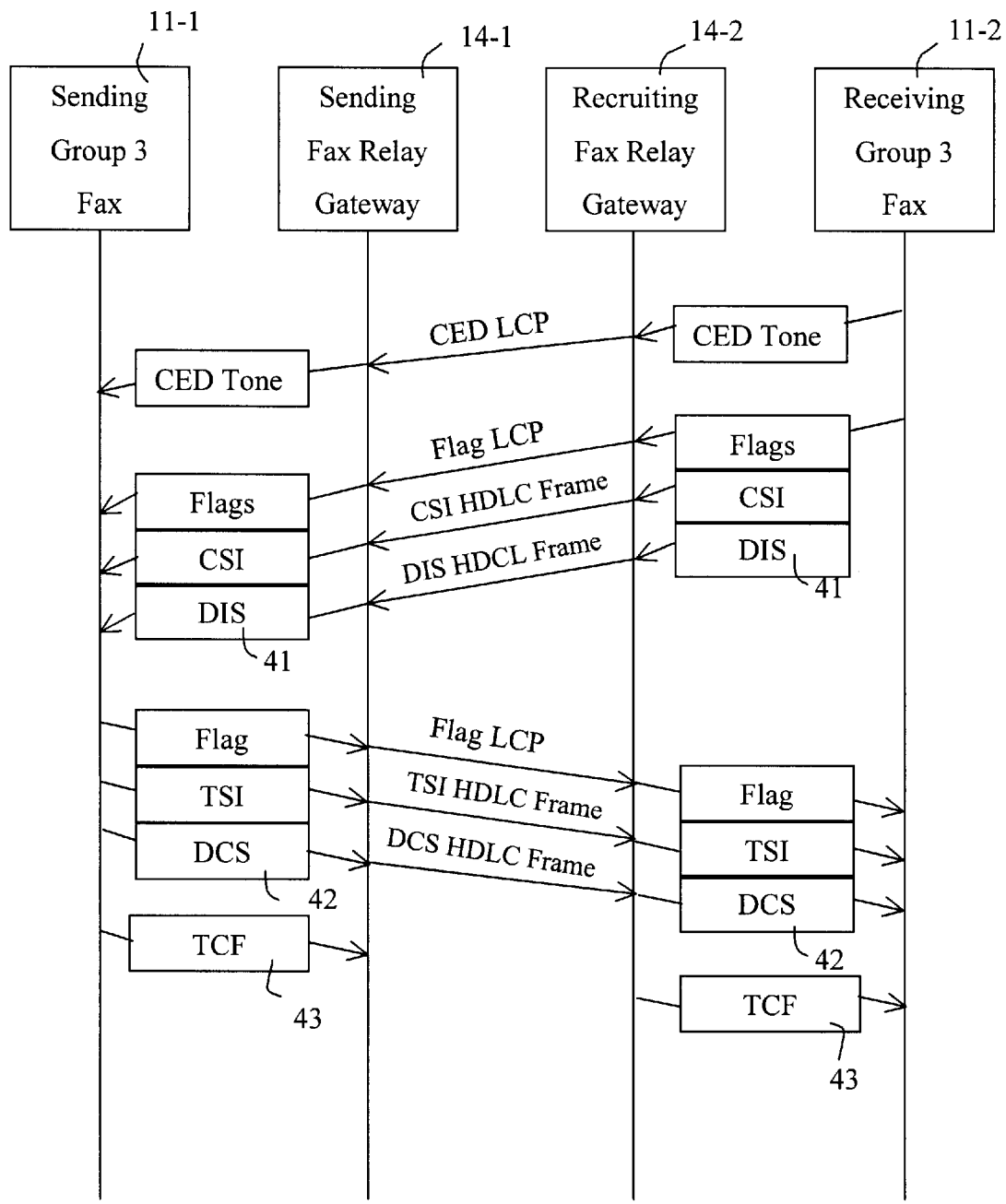
FIG. 5 is a diagram representing the flow of initial handshaking control messages between two fax terminals connected via a low rate digital or packet network.

FIG. 5 illustrates an example of the early stages of the Group 3 Fax relay pre-image transmission handshaking sequence. If the "Bandwidth Manager" 22 (FIG. 2), reduces the available bandwidth for a sending FAX relay channel processor,the TCF signal, which is generated at the sending FAX gateway 14-1, can be altered to cause corruption of the training signal. The TCF corruption is repeated until the end-to-end fax transmission rate between the two group 3 fax terminal (11-1 and 11-2) can be supported by the available bandwidth for that virtual channel. If the "Bandwidth Manager" 22, reduces the available bandwidth for a receiving FAX relay channel processor, the TCF signal, which is re-generated at the receiving FAX gateway 14-2 can be altered to cause corruption of the training signal. The TCF corruption is repeated until the end-to-end fax transmission rate between the two group 3 fax terminal (11-1 and 11-2) can be supported by the available bandwidth for that virtual channel. Alternatively, this technique may be supported by either the receiving or the sending gateways or both Group 3 FAX sending and receiving relay gateways (14-1 and 14-2).

If the sending gateway 14-1 determines that the available bandwidth is reduced or the network jitter is above a certain threshold, the sending gateway 14-1 modifies the MCF message from the receiving fax machine 11-2 MCF is defined in T.30 to indicate that a complete message has been satisfactorily received and that additional messages may follow. The MCF message is replaced with and RTP message. Retrain Positive (RTP) is defined in T.30 to indicate that a complete message has been received and that additional messages may follow after retransmission of training and confirmation (CFR).

Some of the call set up and training messages (per the T-30 protocol) are shown in FIG. 5. Once the call has been set up, the receiving fax machine 11-2 sends a Digital Identification Signal (DIS) 41 handshake message. This message provides the capabilities of the receiving fax machine 11-2. The sending fax machine 11-1 then responds with the Digital Command Signal (DCS) 42 handshake message which lists the proposed call parameters.

Thereafter, the training sequence (or line quality testing) is initiated by the sending fax machine 11-1 by sending the TCF 43 message using the data rate specified in the earlier DCS message. If the receiving fax machine 11-2 reads the test pattern without error, it returns a Confirmation to Receive (CFR) message which completes the training sequence prior to image transmission at the transmission rate specified in the previous DCS 41 message. On the other hand, if the receiving FAX machine 11-2 receives corrupted TCF data, it returns the Failure to Train (FTT) message. Once an FTT message is received by the sending fax machine 11-1, it then iterates to send a new DCS 41 specifying a lower data transmission rate and follows by sending a TCF 43 at the specified lower data rate. This cycle is repeated until a CFR is received or all the successively lower data rates have been tried.

While the present invention has been described with respect to the preferred embodiments, other types of configurations may be possible, while remaining within the spirit and scope of the present invention, as exemplified by the claims. For example, while the narrowband network has been described as a digital packet network in the first embodiment and a network that includes a satellite transmission path in a second embodiment, one of skill in the art would recognize that other narrowband networks may be utilized in the fax transmission path, while remaining within the scope of the invention as described above. For example, a frame relay network, a TDMA network, or a narrowband analog network, may be substituted for the narrowband networks described in the first and second embodiments. Furthermore, wideband digital networks may be substituted for the PCM-encoded networks described above for the wideband portions of the fax relay network.

Also, fax transmission over the Internet, using an Internet Protocol (e.g., IP), or fax transmission over ATM using ATM fax relay protocol, may be substituted for the narrowband network, thereby allowing fax transmissions over the Internet and ATM networks, even during high congestion times. Fax over compressed channels, fax over cellular networks, or fax over cable modems, may also be performed using the system and method according to the present invention.

Other embodiments of the invention will be apparent to those skilled in the art from a consideration of the specification and the practice of the invention disclosed herein. It is intended that the specification be considered as exemplary only, with the true scope and spirit of the invention being indicated by the following claims.

What is claimed is:

1. A method of fax transmission over a fax relay network that includes at least an analog portion and a digital portion of the fax relay network, the method comprising:

receiving, at a first fax relay gateway that communicatively connects a sending fax machine to the digital portion of the fax relay network, image data from the sending fax machine;

converting the image data into digital data to be sent over the digital portion of the fax relay network;

storing the digitized image data in a buffer at the first fax relay gateway;

outputting the digitized image data in accordance with a data rate of the digital portion of the fax relay network, the digitized image data being received by a second fax relay gateway on the digital portion of the fax relay network, the second fax relay gateway communicatively connecting a receiving fax machine to the digital portion of the fax relay network;

determining an amount of data stored in a buffer at either the first fax relay gateway or the second fax relay gateway, or determining the amount of jitter in the received data packets and determining if the amount of the jitter in the reception of packets from the digital network is greater than a predefined threshold; and monitoring the reception of a message confirmation (MCF) message from the receiving fax machine after the reception of a page;

wherein if the determination made of the amount of data stored in the buffer at either the first fax relay gateway or the second fax relay gateway, is that the amount of data stored in the buffer is greater or less than a particular threshold, or that the determination is that the amount of jitter in the reception of packets from the digital network is greater than a predefined threshold, forcing the sending fax machine to initiate a procedure to adjust the transmission data rate.

2. The method according to claim 1, wherein forcing the sending fax machine to initiate a procedure to adjust the transmission data rate is accomplished by replacing the MCF from the receiving fax machine with an RTP (retrain positive) message and is done prior to transmission of a next fax page.

3. The method according to claim 1, wherein the sending fax machine is communicatively connected to a first public switched telephone network, the first public switched telephone network communicatively connecting the sending fax machine with the first fax relay gateway.

4. The method according to claim 3, wherein the receiving fax machine is communicatively connected to a second public switched telephone network, the second public switched telephone network communicatively connecting the receiving fax machine with the second fax relay gateway.

5. The method according to claim 1, wherein the image data received by the first fax relay gateway is converted from pulse-code-modulated format to digital format, by the first fax relay gateway, and wherein the digital data received by the second fax relay gateway is converted from digital format to pulse-code-modulated format, by the second fax relay gateway.

6. The method according to claim 1, wherein the fax relay gateway is a multi-channel system with a single processor handles voice/fax/data calls.

7. The method according to claim 6, wherein a collocated process determines the available bandwidth and notifies a channel processor.

8. The method according to claim 7, wherein detection of a fax signal in voice by the channel processor is used to determine the need to request for bandwidth adjustment from the collocated process.

9. The method according to claim 8, wherein the detection of the FAX in a voice channel comprises decoding of the ITU-T specified V.8 CM and JM sequence.

10. The method according to claim 6, where a local process at the gateway determines the available bandwidth and notifies a channel processor.

11. The method according to claim 1, wherein a probing mechanism determines network delay, bandwidth and packet jitter on a call-by-call basis at the start of a facsimile call.

12. The method according to claim 11, wherein the probing mechanism comprises transmission of data from the first relay gateway to the second relay gateway.

13. The method according to claim 11, wherein the probing mechanism comprises transmission of data from the second relay gateway to the first relay gateway.

14. The method according to claim 11, wherein the probing mechanism probes network delay, bandwidth and packet jitter prior to the pre-message procedure defined in the International Telecommunications Union Telecommunications Standardization Section (ITU-T) Recommendation T.30.

15. The method according to claim 11, wherein the amount of network delay, bandwidth, or jitter in the reception of probing signals from the digital packet network is used to manipulate the Digital Identification Signal (DIS) signal from the receiving fax machine to the sending fax machine.

16. The method according to claim 15, wherein the DIS signal is manipulated by choosing a lower fax transmission rate.

17. The method according to claim 11, wherein the amount of network delay, bandwidth or jitter in the reception of probing signals from the digital packet network is used to manipulate a Training Check Function (TCF) signal at one of the fax relay gateways.

18. The method according to claim 17, wherein the TCF training sequence following a pre-message handshake is corrupted by either the first fax relay gateway or the second fax relay gateway to force the end-to-end fax transmission rate to accommodate the digital network bandwidth, delay and jitter characteristic.

19. The method according to claim 18, wherein if a first corruption of the TCF training sequence does not reduce the fax transmission rate to a pre-determined rate, a subsequent TCF sequence is corrupted by either the first or the second fax relay gateway.

20. The method in claim 1, wherein real-time monitoring of the network throughput, delay and packet jitter during the transmission of a page by the first or second fax gateway is used to force a rate renegotiation for subsequent fax transmission pages by replacing the MCF with an Retrain Positive (RTP) message.

21. A method of fax transmission over a fax relay network that includes at least a wideband portion and a narrowband portion, the method comprising:

receiving, at a first fax relay gateway that communicatively connects a sending fax machine to the narrowband portion of the fax relay network, image data from the sending fax machine;

storing the image data in a buffer at the first fax relay gateway;

outputting the digitized image data in accordance with a data rate of the narrowband portion of the fax relay network, the digitized image data being received by a second fax relay gateway on the digital portion of the fax relay network, the second fax relay gateway communicatively connecting a receiving fax machine to the digital portion of the fax relay network;

determining an amount of data stored in the buffer at the first fax relay gateway, or determining the amount of jitter in the received data packets and determining if the amount of the jitter in the reception of packets from the narrowband network is greater than a predefined threshold; and monitoring the reception of a message confirmation (MCF) message from the receiving fax machine after the reception of a page;

wherein if the determination made of the amount of data stored in the buffer at the first fax relay gateway or in a buffer at the second fax relay gateway, is that the amount of data stored in one of the two buffers is greater or less than a particular threshold, or that the determination is made that the amount of jitter in the reception of packets from the narrowband network is greater than a predefined threshold, replacing the MCF from the receiving fax machine with an RTP (retrain positive) message to force the sending fax machine to initiate a retrain procedure prior to the transmission of the next fax page.

22. The method according to claim 21, wherein the sending fax machine is communicatively one of a first public switched telephone network and a first private branch exchange, the one of the first public switched telephone network and the first private branch exchange communicatively connecting the sending fax machine with the first fax relay gateway.

23. The method according to claim 22, wherein the receiving fax machine is communicatively connected to one of a second public switched telephone network and a second private branch exchange, the one of the second public switched telephone network and the second private branch exchange communicatively connecting the receiving fax machine with the second fax relay gateway.

24. The method according to claim 21, wherein the narrowband portion is a digital network.

25. The method according to claim 24, wherein the wideband portion is an analog network.

26. The method according to claim 25, wherein the image data received by the first fax relay gateway is converted from pulse-code-modulated format to digital format, by the first fax relay gateway, and 27. A System for fax transmission over a fax relay network that includes at least an analog portion and a digital portion, the system comprising:
- a first fax relay gateway communicatively connecting a sending fax machine to the digital portion of the fax relay network and receiving image data from the sending fax machine;
- means for converting the image data into digital data to be sent over the digital portion of the fax relay network;
- said first fax relay gateway configured to store the digitized image data;
- a second fax relay gateway on the digital portion of the fax relay network, at least one of said first fax relay gateway and said second fax relay gateway including a buffer, said second fax relay gateway configured to receive the digitized image data in accordance with a data rate of the digital portion of the fax relay network, said second fax relay gateway communicatively connecting a receiving fax machine to the digital portion of the fax relay network;
- means for determining an amount of data stored in said buffer at either said first fax relay gateway and said second fax relay gateway, or means for determining the amount of jitter in the reception of packets and determining if the amount of the jitter in the reception of packets from the digital network is greater than a predefined threshold;
- means for monitoring the reception of a message confirmation (MCF) message from tile receiving fax machine after the reception of a page; and
- means for forcing the sending fax machine to initiate a procedure to adjust the transmission data rate if the determination made of the amount of data stored in the buffer at either the first fax relay gateway or the second fix relay gateway, is that the amount of data stored in the buffer is greater or less than a particular threshold, or that the determination is that the amount of jitter in the reception of packets from the digital network is greater than a predefined threshold, said first fax relay gateway communicatively connecting said sending fax machine on the wideband portion of the network to the narrowband portion of the network, the first fax relay gateway receiving image data from the sending fax machine and outputting digitized image data in accordance with a data rate of the narrowband portion of the fax relay network; and
- said a second fax relay gateway, communicatively connecting to said receiving fax machine to the narrowband portion of the network,
- wherein at least one of the first fax relay gateway or the second fax relay gateway includes a control process that determines whether an amount of data stored in a buffer in the fax relay gateway is greater or less than a particular threshold or determines that the amount of jitter in the narrow band network exceeds a particular threshold, and if so, initiates a retrain procedure to adjust the fax data rate.

28. The system according to claim 27, wherein the at least one of the first fax relay gateway or the second fax relay gateway comprises a single Digital DSP running the control process and at least one channel processor.

29. The system according to claim 28, wherein the channel processor comprises a voice/fax/data detector that detects a fax signal in a voice channel; wherein the detection of the fax signal is used by the control process to determine bandwidth to be allocated to that channel processor.

30. The system according to claim 29, wherein the channel processor comprises a fax modem and a T-30 based fax relay protocol processor to control fax transmissions from the channel processor.

31. The system according to claim 30, wherein the channel processor further comprises a bandwidth adapter that adjusts the fax transmission rate from the channel processor.

32. The system according to claim 27, wherein the control process runs on a processor separate from a Digital Signal Processor (DSP) that runs a channel processor.

33. The system according to claim 27, wherein the fax relay network comprises digital/packet network.

34. The system according to claim 33, wherein the fax relay network comprises an analog telephone network.

35. The system according to claim 34, wherein the first fax relay gateway is configured to convert the received image data from the sending fax machine in pulse code modulated format to digital format, and
wherein the second fax relay gateway is configured to convert received digital data from the first fax relay gateway to pulse code format data that is transmitted to the receiving fax machine.

36. The system according to claim 27, further comprising a probing mechanism that determines network delay, bandwidth availability, and packet jitter on a call-by-call basis at the start of a facsimile call.

37. The system according to claim 27, further comprising means for determining network delay, bandwidth availability, and packet jitter on a real-time basis.

38. The system according to claim 36, wherein the one of the first fax relay gateway or the second fax relay gateway further comprises a channel processor with a bandwidth adaptor that adjusts the fax transmission rate by manipulating the Digital Identification Signal (DIS) from the receiving fax machine to the sending fax machine 39. The system according to claim 36, wherein the one of the first fax relay gateway or the second fax relay gateway further comprises a channel processor with a bandwidth adapter that adjusts the fax transmission rate by manipulating a Training Check Function (TCF) signal so that a fax transmission data rate adjustment is made.

40. The system according to claim 37, wherein the one of the first fax relay gateway or the second fax relay gateway further comprises a channel processor with a bandwidth adapter that forces a rate renegotiation between the transmission of fax pages by replacing a MCF message with a Retrain Positive (RTP) Message.

* * * * *